Feb. 16, 1937.  G. K. McKEE  2,070,799
SHOCK ABSORBER
Filed Aug. 21, 1933  4 Sheets-Sheet 4

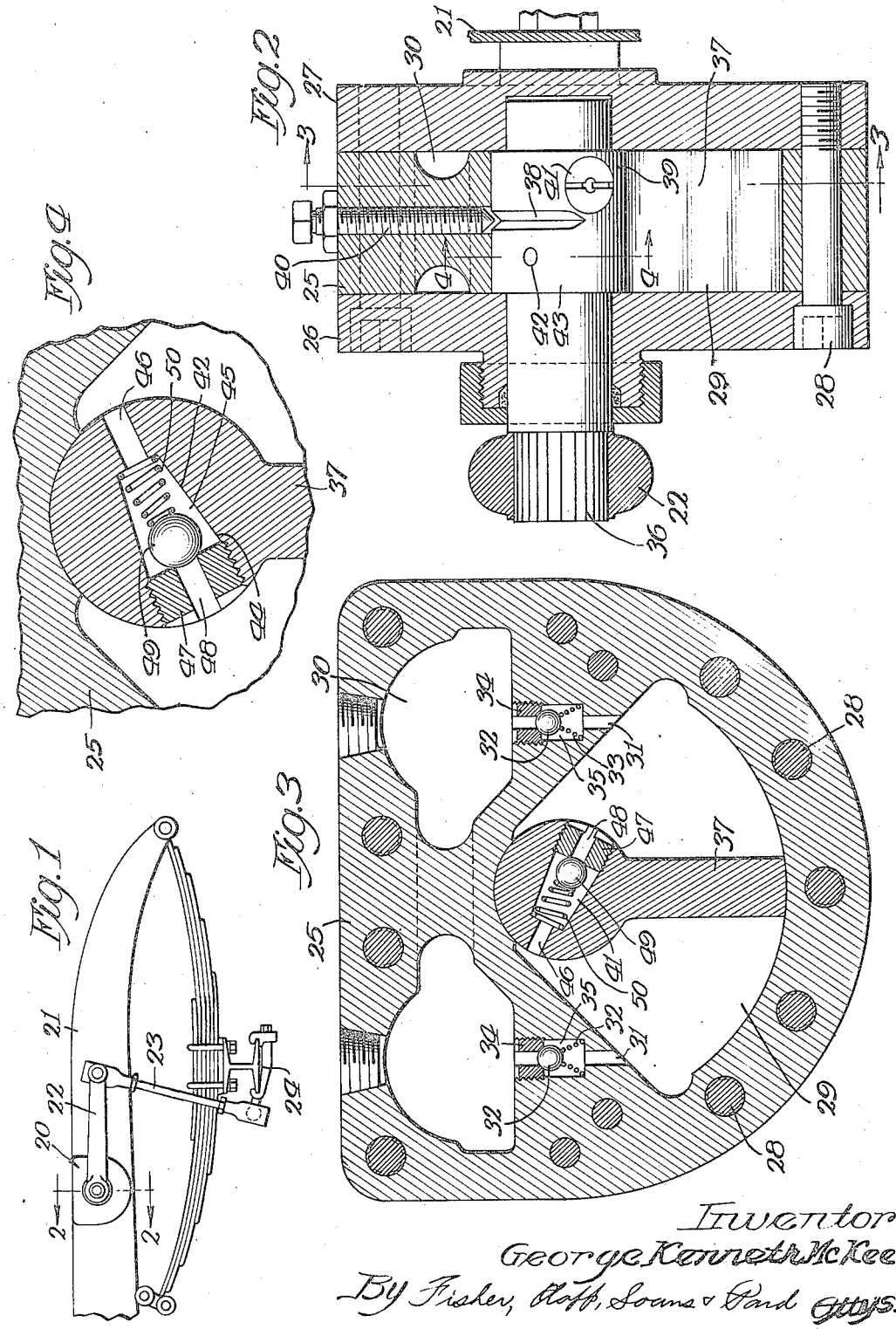
Feb. 16, 1937. G. K. McKEE 2,070,799
SHOCK ABSORBER
Filed Aug. 21, 1933 4 Sheets-Sheet 1
Inventor
George Kenneth McKee Feb. 16, 1937.    G. K. McKEE    2,070,799
SHOCK ABSORBER
Filed Aug. 21, 1933    4 Sheets-Sheet 2
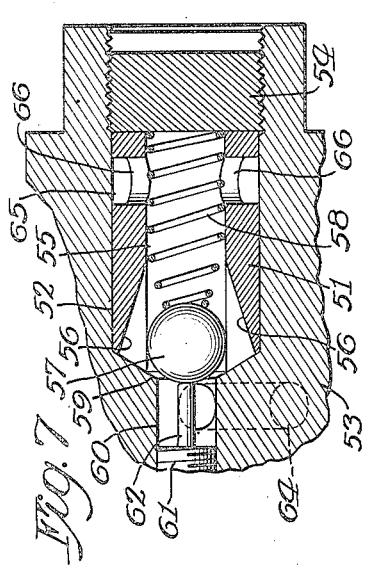
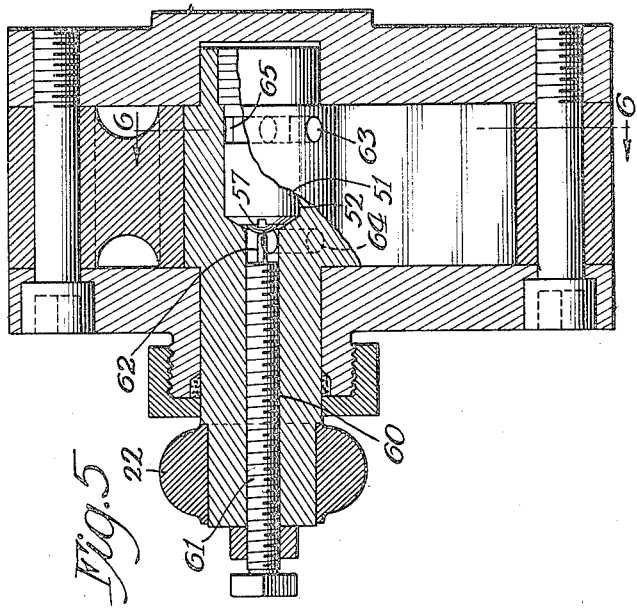
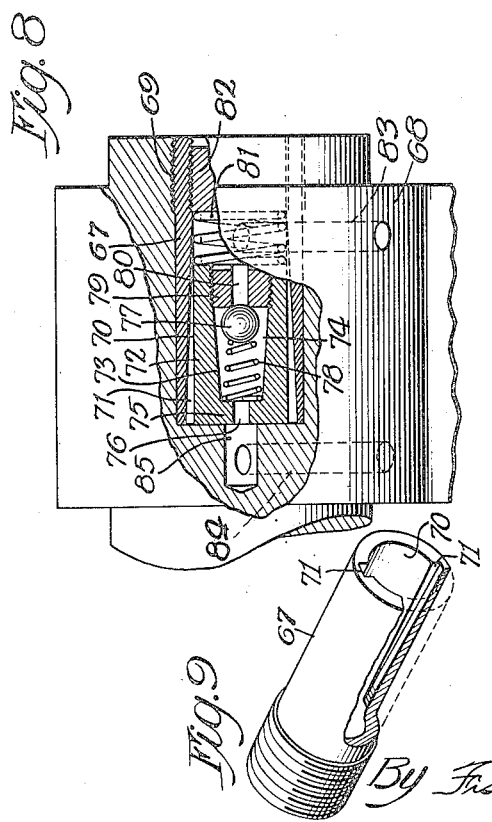
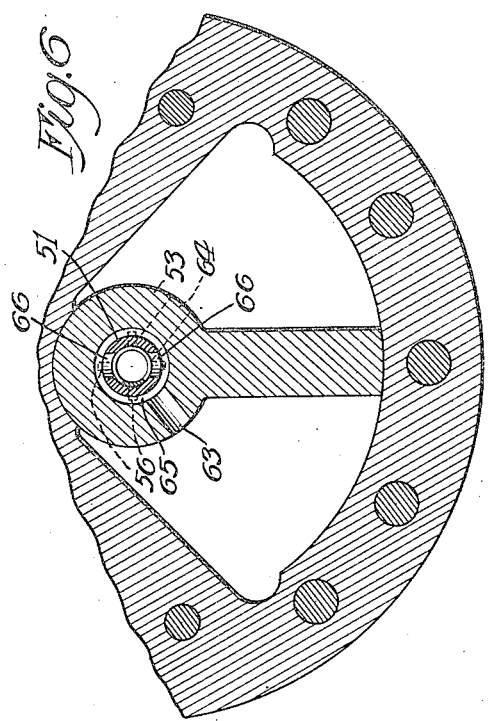
Inventor
George Kenneth McKee
By Fisher, Clapp, Soans & Pond Attys.

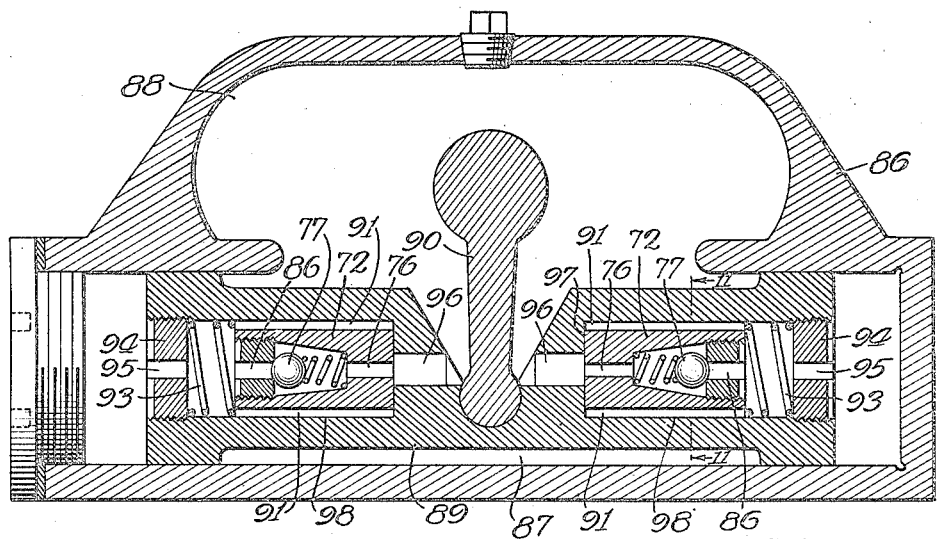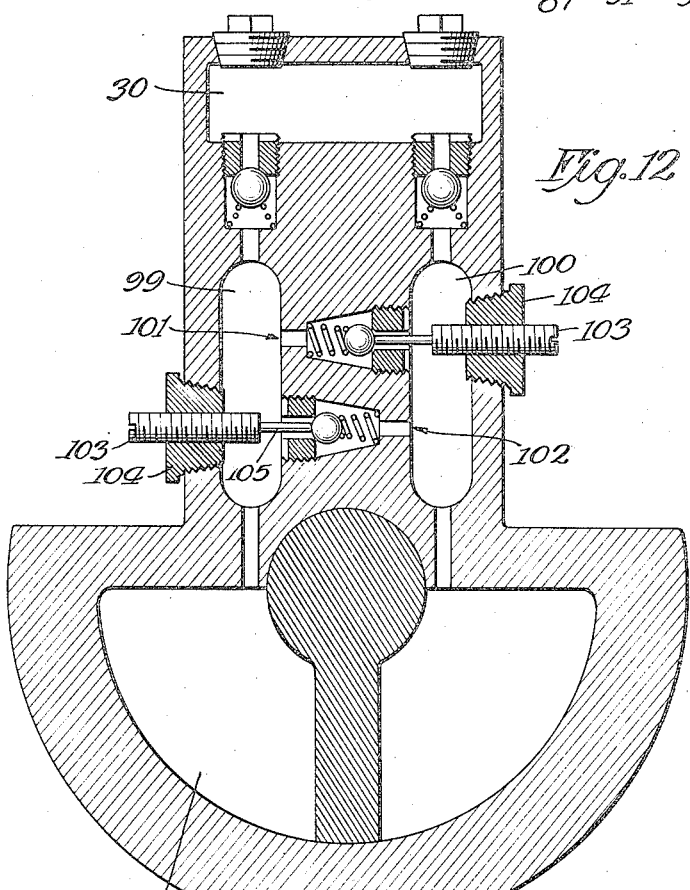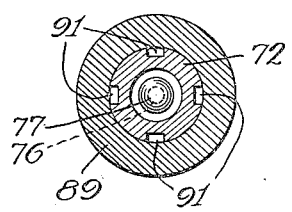

Inventor
George Kenneth McKee
By Fisher, Clapp, Soans & Pond Attys.

Patented Feb. 16, 1937

2,070,799

UNITED STATES PATENT OFFICE 2,070,799

SHOCK ABSORBER

George K. McKee, Cincinnati, Ohio

Application August 21, 1933, Serial No. 686,096

10 Claims. (Cl. 188—89)

This invention relates to improvements in shock absorbers and more particularly to improvements in shock absorbers of the hydraulic type for automobile use.

The main objects of the invention are to provide a shock absorber having improved and simplified means for controlling the flow of the fluid medium used in the device; to provide a construction which is easily adjustable to provide the desired shock-absorbing effect; to provide an arrangement in which a single or unitary valve structure controls the flow of the fluid in both directions; and in general, it is the object of the invention to provide an improved shock absorber of the type referred to.

Other objects and advantages of the invention will be understood by reference to the following specification and accompanying drawings (4 sheets) in which several forms of automobile shock absorbers are illustrated.

In the drawings:

Fig. 1 is a side elevation illustrating the installation of a shock absorber of the type herein referred to.

Fig. 2 is a section on the line 2—2 of Fig. 1.

Figs. 3 and 4 are sections on the lines 3—3 and 4—4, respectively, of Fig. 2.

Fig. 5 is a section similar to Fig. 2, but showing a modified construction.

Fig. 6 is a section on the line 6—6 of Fig. 5.

Fig. 7 is an enlargement of a portion of the structure shown in Fig. 6.

Fig. 8 is an elevation, partly in section, of a modified arrangement of a part of the mechanism shown in Fig. 5.

Fig. 9 is a perspective illustrating the construction of an element of the structure shown in Fig. 8.

Fig. 10 is a section through another type of shock absorber.

Fig. 11 is a section on the line 11—11 of Fig. 10.

Fig. 12 is a section similar to Fig. 3, but showing still another form of construction.

Figures 13, 14:
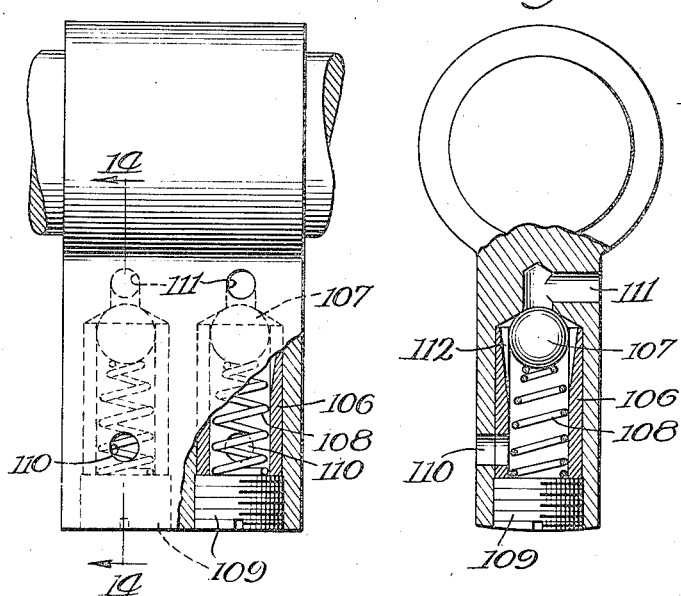

Fig. 13 is a side elevation, partly in section, of another form of piston for use in a structure such as shown in Figs. 3 and 6.

Fig. 14 is a section on the line 14—14 of Fig. 13.

Figure 15:
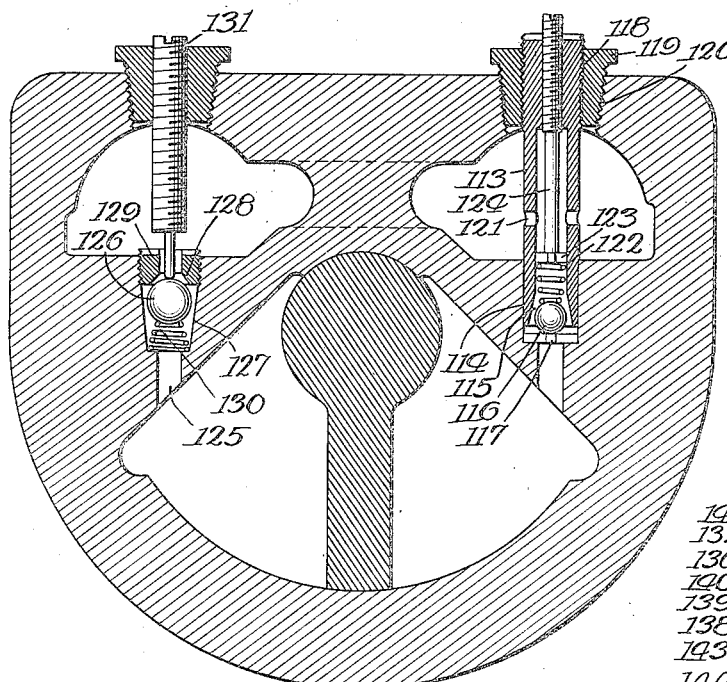

Fig. 15 is a section similar to Fig. 3, but showing still another modified arrangement.

Figure 16:
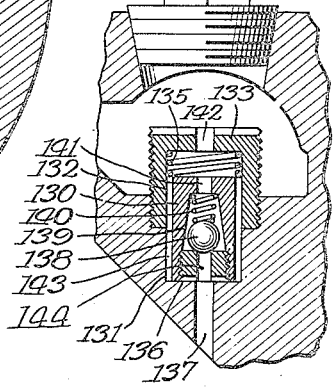

Fig. 16 is a fragmentary section of a modified valve structure; and

Figure 17:
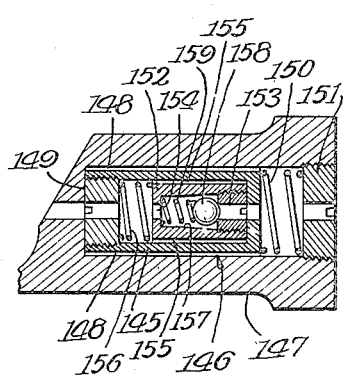

Fig. 17 is a section through another valve structure located in a piston such as shown in Fig. 10.

Referring now to the drawings, it will be seen from Fig. 1 that the shock absorber designated 20 is of the type which is generally secured to the side frame 21 or other suitable part of a vehicle and which shock absorber has an arm 22 connected by a link 23 to the axle or other wheel-carrying part 24.

The present invention has particular reference to the construction of the shock absorber 20 and one such construction is shown in Figs. 2, 3 and 4. The structure there shown includes a casing formed of an intermediate body member 25 and opposite side members 26 and 27, these parts being securely united together by suitable means, such as a plurality of screws 28. The intermediate member 25 is suitably formed or machined to provide a piston chamber 29 and an auxiliary chamber or reservoir 30. The piston chamber 29 is in communication with the reservoir 30 through openings or passageways such as indicated at 31, which are provided with check valves for permitting flow of the fluid medium from the reservoir 30 into the piston chamber, but not from the piston chamber to the reservoir.

As clearly shown in Fig. 3, the check valve may consist of a ball member 32, pressed by a spring 33 into closing position over the inner end of an apertured nut 34 which is threaded into the upper end of the enlarged opening portion 35.

When the wheel-carrying part 24 is subjected to an impact and caused to suddenly move upwardly or when it is permitted to suddenly drop, the arm 22, which is connected to the projecting end 36 of a piston 37 causes such piston to swing in the piston chamber. It being understood that the piston chamber and reservoir are initially supplied with a filling of suitable fluid, such swinging movement of the piston would compress the fluid on either side of the piston according to the direction of its movement. Slight swinging movement of the piston is permitted under normal, smooth pavement driving conditions by a by-pass 38 in the form of a groove extending part way around the piston shaft 39. The groove 38 establishes communication between both sides of the piston chamber in all positions of the piston. A needle valve in the form of a screw 40 is provided for adjusting the effective cross-sectional area of the by-pass 38.

When a large bump or depression in the pavement is encountered, the piston 37 is swung with sufficient force to develop considerable pressure on one side thereof according to the direction of its swinging movement. For relieving such pressure and to permit a portion of the fluid to flow to the other side of the piston, to subsequently check the rebound, a pair of valved passageways 41 and 42, respectively, are provided in the shaft portion 43 of the piston. As will be understood from an inspection of Figs. 2, 3, and 4, the passageways 41 and 42 are at oppositely directed angles and they are each provided with the same kind of valve structure, one of the valves being arranged to permit the flow of fluid in one direction and the other to permit the flow in the opposite direction. As shown in Figs. 3 and 4, the valve structure includes an opening 44 having a tapered, in this instance, conical portion 45, the latter portion being continued with an outlet opening 46 of a smaller diameter than the smallest diameter of the conical portion 45. In the opposite end of the opening, there is seated by screw-threading, an apertured nut or plug 47, the opening 48 of which constitutes the inlet opening of the passageway. A ball member 49, pressed by a spring 50 toward the apertured plug 47 serves to close the inlet opening portion 48 to prevent the passage of fluid through the opening unless sufficient pressure is built up to unseat the valve ball 49 against the pressure of the spring 50.

The tapered opening portion and the ball member cooperate, when the ball is unseated under pressure of the fluid, to vary the rate of flow in accordance with the pressure developed. In the event that a very high pressure is developed which would normally cause an objectionable swinging of the piston 37, the ball 49 is unseated to such an extent that it approaches a position in the tapered opening portion wherein the passageway would be normally closed and hence the passage of fluid highly restricted. When the pressure becomes reduced, the spring 50 acts to move the valve ball 49 toward its inlet seat and thereby toward the larger portion of the tapered opening to gradually increase the effective size of the fluid passageway until such time as the ball again becomes seated on the inlet opening seat to close the passageway. Thus the described valve structure acts to check the initial swinging movement of the piston and to temper the same. When a quantity of fluid has been forced from one side of the piston to the other, the tendency of the wheel-carrying axle to resume a normal position relative to the vehicle frame results in sufficient force to swing the piston back to its normal position against the resistance of the enlarged amount of fluid on one side of the piston. The other check valve then permits a controlled flow of the fluid back to normal or equalized condition.

In the form of construction shown in Figs. 2, 3, and 4, the function of the reservoir 30 is to supply fluid to the piston chamber in the event that leakage develops therefrom which would impair the operating efficiency of the device. The arrangement of check valves between the reservoir and the opposite portions of the piston chamber permits the fluid to pass from the reservoir chamber to the piston chamber as needed, but prevents return of the fluid from the piston chamber to the reservoir.

In Figs. 5, 6, and 7, there is illustrated an arrangement in which a single valve structure positioned in axial alignment with the axis of the wing shaft serves the function of both of the valves shown in the form illustrated in Figs. 2, 3 and 4. The valve structure as shown in Figs. 5, 6, and 7, includes a sleeve element 51 which is positioned in a bore 52 coaxially positioned in the piston shaft 53. The sleeve is maintained in position by means of a screw-threaded plug 54 which, as clearly shown in Fig. 7, is threaded into the open end of the bore 52.

The sleeve 51 has an opening 55 extending therethrough and at one end there is provided one or more slots 56 which constitute tapered openings outwardly of the sleeve opening 55. A ball member 57 is normally urged by a spring 58 toward the seat 59 formed by the junction of the bore 52 and a reduced diameter bore 60. The bore 60 extends through the piston shaft 53 and threadedly receives a valve ball adjusting screw 61, as is clearly shown in Fig. 5. The screw 61 is provided with a reduced end portion 62 which is adapted to engage the ball 57 to prevent the same from seating on the seat 59. By adjustment of the screw 61, the ball 57 may be caused to normally assume any predetermined position relative to the seat 59 to thereby provide a predetermined normal opening between the valve seat and valve ball.

The piston shaft 53 is provided with a pair of apertures 63 and 64 respectively, on its opposite sides. The aperture 63 extends from the outside of the piston shaft to the bore 52 and it communicates with an external, annular recess 65 in the sleeve 51. The sleeve 51 is also apertured as indicated at 66, to establish communication between the aperture 63, channel 65, and the valve sleeve opening 55. The opening 64 establishes communication between the outside of the opposite side of the piston and the end portion of the bore 60 adjacent the ball or inlet end of the valve structure.

By reference to Figs. 5, 6, and 7, it will be apparent that, when the piston is swung in one direction, for example, to the right in Fig. 6, the pressure of the fluid in the right hand piston chamber will be built up and the fluid forced through the opening 64 and against the valve ball 57. If such pressure is great enough, the ball 57 may be unseated to increase the opening at the inlet end of the valve sleeve. However, in the event that the pressure is excessive, the ball will be moved far enough to tend to close the opening by approaching the inner ends of the tapered slots 56. The limited opening provided by normally unseating the ball through the agency of the adjustable screw 61 serves the same purpose as the by-pass opening described in connection with Figs. 2, 3 and 4. For some purposes, it is entirely satisfactory and desirable to provide a fixed, restricted return passageway for the fluid on the return stroke of the piston and in such cases the single, adjustable valve structure described in connection with Figs. 5, 6 and 7, is particularly desirable. Its simplicity obviously results in low cost of construction. The valve action is very regular since the ball member 57 is not permitted to wabble, because it is accurately guided by reason of its fit in the opening 55 of the valve sleeve.

In some instances it is desirable to provide a variable valve action for controlling the flow in both directions. In Figs. 8 and 9, a single, two-way variable valve structure is illustrated. The valve structure there disclosed embodies an outer sleeve 67 fixedly mounted in the piston shaft 68, for example by means of interengaging screw-threading 69. The sleeve 67 has a substantially uniform diameter bore 70 extending therethrough and it is provided with a plurality of slots 71 which taper in depth as clearly shown in Figs. 8 and 9.

A second sleeve or barrel member 72 is slidably mounted within the bore 70 of the sleeve 69 and the said barrel member 72 is provided with an axially extending opening 73 having a tapered or conical portion 74. One end of the member 72 is provided with a head 75 which is drilled out as indicated at 76 to form an outlet opening. A valve ball 77 is positioned within the member 72 and it is normally urged by a spring 78 to move toward the inlet end of the tapered opening portion 74. Outward movement of the valve ball is prevented by means of a plug 79 which is threaded into the inlet end of the sleeve 72 and provided with an inlet opening 80 which is adapted to be closed by seating of the ball 77 against the adjacent end of the plug.

A spring 81 interposed between the inlet end of the inner sleeve 72 and a plug 82 in the outer end of the sleeve 67 serves to normally urge the inner member 72 to move toward the inner end of the bore 70 in the outer sleeve 67.

The piston shaft is provided with a pair of openings 83 and 84, respectively, which communicate with opposite sides of the piston and one of which communicates with the space between the plug 82 and the inner valve sleeve 72, and the other of which communicates with a counterbore 85 which in turn communicates with the inner end of the sleeve 67.

When the piston shaft 68 is caused to turn in one direction, fluid pressure communicated through the opening 83 will be transmitted to the valve ball 77 to unseat the same, thereby permitting a flow through the inlet opening 80 of the inner valve sleeve 72. The action of the ball 77 in the tapered opening portion 74 is the same as described in connection with the action of the valve ball in the structure shown in Figs. 2, 3 and 4. On the return movement of the piston, the pressure of the fluid is transmitted through the opening 84 and exerted against the adjacent end of the sleeve 72 to thereby force the same to move outwardly against the pressure of the spring 81. When the sleeve 72 is moved outwardly, a flow is permitted to take place around the inner end of the sleeve 72 and through the tapered passageways 71. The flow through the passageways 71 is, of course, controlled by the extent of movement of the sleeve 72, inasmuch as the closer the sleeve 72 gets to the outer end of the sleeve 67, the nearer will the sleeve 72 come to closing the tapered opening 71. Hence, it will be seen that the valve structure described in connection with Figs. 8 and 9 is a double-acting structure in which the fluid passageways are varied for both directions of flow.

In Figs. 10 and 11, a different type of shock absorber is illustrated. In this form, there is a main housing or casing 86 which is provided with an elongated piston chamber 87, usually cylindrical in form, which communicates with a reservoir or storage chamber 88. A piston 89 is movable longitudinally in the piston chamber or cylinder 87 and it is actuated by means of an arm 90 which has its upper end connected to a shaft which in turn carries an arm similar to the arm 22 shown in Fig. 1, which is suitably connected to the wheel-carrying part of the vehicle.

As clearly shown, the cylinder 87 is closed at both ends and the piston 89 is provided at each of its ends with a valve structure for permitting the flow of the shock-absorbing fluid from the respective ends of the piston chamber to the reservoir or storage chamber 88.

In the present instance, the valve structure is the same as the inner part of the valve structure shown in Fig. 8, except that the sleeve element is provided with longitudinally extending channels such as shown at 91. Inasmuch as the valve structure is in all other respects similar to that shown in Fig. 8, the description of that portion of the Fig. 8 structure is here referred to and the same reference numerals are applied. The valve sleeve 72 in this instance is urged to move in one direction by means of a spring 93 interposed between a plug member 94 and the adjacent end of the sleeve 72. The plug member 94 is provided with an opening 95 to establish communication between the adjacent cylinder end and the inlet opening 86 of the valve structure, and at the opposite end of each valve structure there is an opening 96 for establishing communication between the discharge openings 76 of the valve structure and the fluid reservoir.

When the piston 89 is moved in one direction, for example to the right in Fig. 10, the pressure of the fluid trapped in the cylinder end unseats the valve ball 77 to permit the controlled escape of such trapped fluid. On reverse movement of the piston, the pressure of the fluid is exerted against the discharge end of the sleeve 72 to unseat the same from the seat or end wall 97 of the piston bore 98 to thereby force the valve sleeve 72 outwardly so as to permit the fluid to flow through the opening 96, around the end of the sleeve 72 and through the passageways 91, and thence to the cylinder end. Thus it will be seen that the improved and simplified valve structure is readily applicable to the type of shock absorber shown in Figs. 10 and 11.

In Fig. 12, there is shown a shock absorber of the general type shown in Figs. 3, 4 and 5, but the fluid controlling valve structures are arranged independently of the piston and in such a manner that the valve openings may be adjusted. In this form, there is a piston and piston chamber and also a reservoir chamber, substantially as explained in connection with Figs. 2, 3 and 4. However, the piston chamber and reservoir chamber are separated to a greater extent to provide space for valve mechanism. The reservoir 30 communicates with the piston chamber through suitable ball check valves substantially as explained in connection with Fig. 3, and through passageways 99 and 100 which are formed partly by cored openings in the manufacturing of the casing element and partly by means of drilling as indicated.

In this instance there are two valve structures similar to the valve structure explained in connection with Figs. 2, 3 and 4, the valve structure designated 101 being arranged to control and vary the flow of fluid under pressure from one side of the piston chamber to the other, while the valve structure 102 is arranged to control and vary the flow in the opposite direction. Inasmuch as the details of the valve structure itself are substantially the same as previously explained in connection with Figs. 2, 3 and 4, the description thereof is referred to and the same reference numerals are used.

However, in the present instance, means is provided for normally unseating each valve ball so as to provide a normally open by-pass through each valve around the other. For this purpose, there is provided in connection with each valve unit a screw member 103 which is adjustable inwardly and outwardly in a plug element 104, so as to cause its reduced end portion 105 to engage and unseat the valve ball. The plug arrangement 104 is provided to permit the machining and placement of the parts of the valve structure. If desired, the valve units may be in the form of self-contained sleeve units embodying the construction of the sleeve element 72 and parts contained therein as shown in Fig. 8. The action of the parts in the arrangement shown in Fig. 12 is similar to that of the parts in the other arrangements described and therefore needs no additional explanation.

In Figs. 13 and 14, valve structures similar to that shown in Figs. 5, 6 and 7, are provided in the wing proper of the wing piston. Each valve embodies a sleeve element 106 having a valve ball 107 mounted therein and normally urged toward one end thereof by means of a spring 108. The sleeve member 106 is held in position in a suitable bore in the wing by means of a plug 109. One of the valves communicates at its outer end with one side of the piston wing through an opening such as indicated at 110, and at its ball end the structure communicates with the opposite sides of the piston through an opening as indicated at 111. The other valve is oppositely arranged in respect of its communication with the opposite side of the piston wing. By reference to Fig. 14, it will be seen that when pressure is exerted on the right hand side of the wing, the ball member will be unseated to permit a controlled flow through the valve sleeve and outwardly through the discharge opening 110. When the pressure is on the opposite side of the wing, the flow will be through the other valve. Thus the arrangement is similar in its operation to the arrangement shown in Figs. 2, 3 and 4. The sleeve 106 in each of the valves is provided with a plurality of tapered slots as indicated at 112, with which the ball element co-acts to vary the rate of flow in accordance with the degree of pressure placed on the ball by the fluid.

In Fig. 15, there is still another arrangement embodying valves of the kind herein referred to. In this instance there are two valves. The one at the right hand side of the figure includes an elongated sleeve element 113 having its inner end slidably received in an opening 114 in a portion of the shock absorber housing. The said inner end of the sleeve is also provided with a conical internal wall portion 115 which constitutes a seat which is adapted to receive a valve ball 116 to cooperate therewith in the same manner that the valve ball and tapered or conical opening walls cooperate in the previously described arrangements. In this instance the valve ball is supported by a spider plate 117 which does not materially obstruct the passageway, but is sufficient to support the ball. The valve sleeve 113 is adjustable relative to the supported position of the ball by being screw-threaded as indicated at 118 in a plug 119. The plug 119 is provided so as to permit the formation of a large opening in the casing to facilitate the machining of the opening 114 and the insertion of the valve parts. The said plug is mounted in the enlarged opening by means of screw-threading as shown at 120. Apertures such as indicated at 121 are provided in the sleeve to establish communication between the inside of the sleeve and the fluid chamber, as clearly shown. The valve ball is normally urged into engagement with the spider 117 by means of a spring 122, one end of which engages the valve ball and the other end of which is engaged by a spider element 123 carried by an adjusting screw 124. The adjusting screw 124 is threaded through the upper end portion of the sleeve 113 and it will be evident that by adjusting the screw 124 inwardly or outwardly the pressure of the spring 122 will be correspondingly varied.

At the opposite side of the device, there is provided another valve structure which in this instance includes an opening 125 connecting the piston chamber and the upper or reservoir chamber. The opening 125 is preferably provided with a ball check valve including a valve ball 126 disposed within a tapered or conical portion 127 of the said opening. A valve seat 128 is provided on the inner end of a plug 129 and a spring 130 normally urges the ball to move toward the said valve seat. An adjustable screw element 131 may be provided for normally unseating the valve ball 126 to provide, in effect, a by-pass or limited passageway for the fluid to flow from the left hand side of the piston chamber to the right hand side.

It will be evident that when pressure is developed on the right hand side of the piston chamber, the fluid will flow through the valve sleeve 113, through the openings 121 therein, through the upper or reservoir chamber and through the valved opening 125 to the left hand side of the piston chamber. The action of the valve ball 116 in the tapered or conical opening of the end of the sleeve 113 will be readily understood in view of the preceding explanation. Inasmuch as the valve structure at the right hand side of the device is not arranged to control the flow in the reverse direction, the provision of the check valve structure at the left hand side is desirable. For some purposes, the valve structure shown at the left hand side would alone be sufficient provided that communication be suitably established between the right hand side of the piston chamber and the top of the said valve structure. It will be observed that the valve ball 126 and the tapered or conical valve opening portion 127 will have the effect of controlling the flow in accordance with the pressure exerted and displacement of the ball. The flow in the reverse direction is, of course, the same either with or without the adjustable valve structure illustrated at the right hand side of the figure. If the valve structure shown at the left hand side of the figure be used alone, that is, without the valve arrangement shown at the right-hand side but with only an unobstructed passageway in place of said right-hand side valve arrangement to maintain the opposite sides of the piston chamber in communication with each other, the action of the shock absorber would be substantially the same as the action of the structure shown in Figs. 5, 6 and 7.

In Fig. 16, there is shown a valve structure similar to that illustrated in connection with the form of shock absorber shown in Fig. 10, but in this instance applied to a shock absorber of the form shown in Fig. 15. The valve structure includes a sleeve element 130 which is axially movable in an opening or recess 131 formed in the shock absorber housing and also in a continuation 132 of such opening, the continuation being formed in a member 133 which is threaded as indicated at 134 into a counterbored portion of the opening 131. A spring 135 normally urges the valve sleeve 130 downwardly to seat on the shoulder 136 formed by the junction of the opening 131 and inlet open portion 137. A valve ball 138 is disposed within the sleeve 130 and cooperates with a conical or tapered opening portion 139 provided therein in the manner already explained. A spring 140 normally urges the ball 138 to close the inlet opening 144 in the end of the sleeve.

When fluid pressure is exerted against the ball 138, the latter will be unseated and the fluid permitted to flow around the ball and through the discharge opening 141 in the sleeve end and through an outlet opening 142 in the member 133. In the event that the pressure is excessive, the entire valve structure, i. e., the valve ball and the sleeve 130, may be raised as a unit to thereby permit the fluid to pass around the sleeve 130 through channels 143 provided in the outside of the sleeve.

In Fig. 17, there is illustrated another form of valve adapted particularly for use in the piston of a shock absorber of the type shown in Fig. 10. This valve includes an outer sleeve 145 slidably disposed in the hollow 146 of the piston 147. The sleeve 145 is longitudinally channeled as shown at 148 and is normally seated at one end as shown at 149 on the bottom of the piston hollow. A spring 150 interposed between the other end of the sleeve and a plug 151 in the end of the piston, yieldingly holds the sleeve in its illustrated seated or closed position.

The sleeve 145 is provided with apertured end closures as illustrated to permit, under certain circumstances, fluid to pass therethrough.

A second or inner sleeve 152 is slidably mounted inside of the outer sleeve 145 and is provided with apertured end closures, the aperture 153 constituting an inlet opening and the aperture 154 constituting an outlet opening. The sleeve 152 is also exteriorly channeled as indicated at 155 and it is normally urged to closed position by a spring 156 interposed between its outlet end and the adjacent end of the outer sleeve.

The inner sleeve 152 is provided with a conically-shaped interior 157 within which there is disposed a ball member 158 which is normally urged to seated or closed position with reference to the inlet opening 153 by means of a spring 159.

The valve structure shown in Fig. 17 is such that when the piston is moved forwardly, i. e., to the right, so as to build up pressure in the liquid at the right-hand end of the piston, the liquid pressure will initially tend to unseat the valve ball 158 to permit a regulated flow of the liquid through the piston. In the event that the pressure is built up so quickly that the ball would restrict the flow more than is desirable, the inner sleeve 152 will be additionally moved longitudinally against the pressure of the spring 156 so as to establish communication to the channels 155, whereby some of the liquid under pressure will be by-passed around the ball valve structure. On the return stroke of the piston, the full pressure will, of course assist the springs 156 and 159 to close their respective members, while also acting to move the outer sleeve member 145 to open position against the pressure of the spring 150. When the sleeve 145 is so moved, fluid will be permitted to pass through the channels 148 into the end of the chamber in which the piston moves.

The various embodiments above described obviously utilize the same type of valve structure and the same valve control of the rate of flow from one chamber to another. The various embodiments disclose structures which may be commercially constructed at low cost so that the entire cost of shock absorbers embodying the described improvements may be maintained at a very low figure, thereby making the shock absorbers a practical addition to most vehicles from a cost standpoint.

Obviously, the valve structure shown in Fig. 17 may be utilized in other locations, for example, in the arrangement shown in Fig. 15, instead of the adjustable valve structure at the right-hand side of the figure, in Fig. 16, or in a single valve arrangement such as shown in 5 to 8 inclusive. Other arrangements of the various valve structures will also be evident and changes in the details of the described structure may be made without departing from the spirit of the invention, the scope of which should be determined by reference to the following claims, the same being construed as broadly as possible consistent with the state of the art.

I claim as my invention:

1. A hydraulic shock absorber comprising a casing having a piston chamber, a piston therein, means interconnecting the chamber portions on opposite sides of said piston, and a pressure-operated check valve for controlling the flow in one direction through said means, said check valve comprising an opening having a conical portion adjacent one end, a movable member of smaller diameter than the largest diameter of said conical opening portion and of a diameter approximating the smallest diameter of said conical portion, means adjacent the larger end of said conical opening portion having an opening communicating with said conical portion and constituting a valve seat adapted to cooperate with said movable member to control the flow in one direction through said means, and means yieldingly urging said movable member toward said seat.

2. In a shock absorber, the combination of a casing having a chamber therein, a piston movable in said chamber, said piston having an opening communicating with the chamber portions of each side thereof, and a check valve in said opening comprising a sleeve having a tapered opening portion, a closure member in said sleeve and movable toward the small end of said tapered opening portion to tend to close the same, and means normally urging said closure member toward the large end of said tapered opening portion.

3. In a shock absorber, the combination of a casing having a chamber therein, a piston movable in said chamber, said piston having an opening communicating with the chamber portions on each side thereof, said opening including an inlet portion and a tapered portion, a member in said opening and movable therein from normally closed position adjacent the inlet portion of said opening toward the small end of said tapered opening portion to tend to close the same, and yielding means normally maintaining said member in said normal position.

4. In a shock absorber of the class described, the combination of a casing having a piston chamber therein, a piston movable in said chamber, said casing having a passageway connecting the chamber portions on opposite sides of said piston, and valve means for regulating the flow through said passageway comprising a ball member, a sleeve adjustably mounted in said casing and having a passageway therethrough with a seat for cooperating with said ball to restrict the passageway, spring means for yieldingly maintaining said ball member in spaced relation to said seat, and means for adjusting the pressure of said spring on said ball member.

5. In a shock absorber of the class described, the combination of a casing having a piston chamber therein, a piston movable in said chamber, said casing having a passageway connecting the chamber portions on opposite sides of said piston, and valve means for regulating the flow through said passageway comprising a ball member, a sleeve adjustably mounted in said casing and having a passageway therethrough with a seat for cooperating with said ball to restrict the passageway, and spring means for yieldingly maintaining said ball member in spaced relation to said seat.

6. In a shock absorber of the class described, the combination of a casing having a piston chamber therein, a piston movable in said chamber, said casing having a passageway connecting the chamber portions on opposite sides of said piston, and valve means for regulating the flow through said passageway comprising a ball member, a seat in said passageway for cooperating with said ball to restrict the passageway, spring means for yieldingly maintaining said ball member in spaced relation to said seat, and means for adjusting the pressure of said spring on said ball member.

7. In a hydraulic shock absorber of the class described having a fluid passageway, valve means for controlling the passage of fluid under pressure comprising a sleeve element interposed in the fluid passageway for longitudinal sliding movement and having a restricted opening in one end, a member disposed in said sleeve and adapted to close said restricted opening, spring means engaging said member to yieldingly hold the latter away from said restricted opening, a seat for receiving one end of said sleeve, a spring urging said sleeve end against said seat to prevent substantial fluid flow between said sleeve end and seat, the structure also including a channel providing a fluid passageway from end to end of said sleeve externally thereof, said passageway constituting a by-pass for relieving excessive fluid pressure which is sufficient to unseat said sleeve against the pressure of said spring.

8. A hydraulic shock absorber of the class described having a fluid passageway, valve means for controlling the passage of fluid under pressure comprising a sleeve fixedly mounted in a portion of the passageway and provided with a groove in its inner surface, said groove being gradually reduced in its cross-sectional area from its inlet end to its outlet end, a second sleeve slidably mounted within the first sleeve for cooperating with said groove to vary the effective cross-sectional area of the discharge end of the groove, said second sleeve having an internal opening portion tapered oppositely to the taper of said groove, a member within said second sleeve for cooperating with said tapered opening portion to vary the effective cross sectional area of the fluid passageway in said second sleeve, and spring means acting in opposite directions on said second sleeve and member respectively.

9. In a shock absorber of the class described, the combination of a casing having a chamber therein, a piston movable in said chamber, said piston being hollow and having openings in its ends, and a valve structure in the hollow of said piston comprising an outer sleeve slidably mounted in said piston and having apertured end closures, spring means normally urging said outer sleeve into engagement at one end with the adjacent end of the piston hollow, said outer sleeve being exteriorly channeled to provide a passageway for fluid from one end thereof to the other and said passageway being normally closed by engagement of said end of the sleeve with said end of the piston hollow, an inner sleeve slidably mounted in said outer sleeve and having an inlet opening and a tapered opening portion, a member in said tapered opening portion and movable therein from normally closed position adjacent the inlet opening thereof toward the small end of said tapered portion to tend to close the same, yielding means normally maintaining said member in said normally closed position, said inner sleeve being exteriorly channeled to provide a by-pass around said last mentioned opening and member, and spring means normally urging said inner sleeve to closed position wherein one end of the sleeve engages the adjacent end closure of the outer sleeve to thereby close said inner sleeve channel.

10. A hydraulic shock absorber of the class described having a valved fluid passageway and comprising a body having a passageway therein, said passageway being provided with a groove and said groove being gradually reduced in its cross-sectional area from its inlet end to its outlet end, a sleeve slidably mounted within said grooved passageway for cooperating with said groove to vary the effective cross-sectional area of the discharge end of the groove, said sleeve having an internal opening portion tapered oppositely to the taper of said groove, a member within said sleeve for cooperating with said tapered opening portion to vary the effective cross-sectional area of the fluid passageway in said sleeve, and spring means acting in opposite directions on said sleeve and member respectively.

GEORGE K. McKEE.